United States Patent
Yonezawa (10) Patent No.: US 10,173,566 B2
(45) Date of Patent: Jan. 8, 2019

(54) SEAT PAD

(71) Applicant: BRIDGESTONE CORPORATION, Tokyo (JP)

(72) Inventor: Taisuke Yonezawa, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/524,726

(22) PCT Filed: Jan. 13, 2016

(86) PCT No.: PCT/JP2016/050782
§ 371 (c)(1),
(2) Date: May 5, 2017

(87) PCT Pub. No.: WO2016/117423
PCT Pub. Date: Jul. 28, 2016

(65) Prior Publication Data
US 2017/0327020 A1    Nov. 16, 2017

(30) Foreign Application Priority Data

Jan. 19, 2015 (JP) ................................. 2015-007648

(51) Int. Cl.
*B60N 2/90*    (2018.01)
*A47C 7/02*    (2006.01)
(Continued)

(52) U.S. Cl.
CPC .................. *B60N 2/70* (2013.01); *A47C 7/18* (2013.01); *A47C 7/20* (2013.01); *A47C 27/14* (2013.01); *B60N 2/64* (2013.01)

(58) Field of Classification Search
CPC .... B60N 2/64; B60N 2/70; A47C 7/18; A47C 7/20; A47C 27/14
(Continued)

(56) References Cited

U.S. PATENT DOCUMENTS 3,401,217 A * 9/1968 Burwell ................... A47C 7/18
                                                    297/452.26 X
3,713,696 A * 1/1973 Dudley ................... B60N 2/64
                                                    297/452.26
(Continued)

FOREIGN PATENT DOCUMENTS

CN          104582538 A      4/2015
EP          2 657 071 A1    10/2013
(Continued)

OTHER PUBLICATIONS

International Search Report for application No. PCT/JP2016/050782 dated Feb. 16, 2016.
(Continued)

*Primary Examiner* — Rodney B White
(74) *Attorney, Agent, or Firm* — Sughrue Mion, PLLC (57) ABSTRACT

A seat pad (10) is formed from a foamed molded body. A passenger contact surface (11) which, in a plan view of the seat pad (10), is formed in the shape of a rectangle that is long in the lengthwise direction (X) and short in the widthwise direction (Y), is provided. The passenger contact surface (10) comprises a main pressure-receiving area (11a) with which the buttocks or the waist of a passenger come into contact, and a subsidiary pressure-receiving area (11b) that is adjacent to the main pressure-receiving area (11a) in the lengthwise direction (X). The passenger contact surface (11) is provided with partitioning grooves (15) that extend in the lengthwise direction (X) and that are arranged across the main pressure-receiving area (11a) and the subsidiary pressure-receiving area (11b). The partitioning grooves (15) are arranged so as to lie parallel to each other in the widthwise direction (Y). Additional grooves (16) are formed on the bottom surfaces of the partitioning grooves (15). In the partitioning grooves (15), the average volume, which is the ratio of the volume of the additional grooves (16) per unit (Continued)

FIG. 1 area of the bottom surfaces of the partitioning grooves (15), is smaller in a first section (15a) located in the main pressure-receiving area (11a) than in a second section (15b) located in the subsidiary pressure-receiving area (11b).

6 Claims, 8 Drawing Sheets

(51) Int. Cl.
   *B60N 2/70* (2006.01)
   *A47C 27/14* (2006.01)
   *A47C 7/18* (2006.01)
   *A47C 7/20* (2006.01)
   *B60N 2/64* (2006.01)

(58) Field of Classification Search
   USPC .................. 297/452.21–452.37, 452.48
   See application file for complete search history.

(56) References Cited

U.S. PATENT DOCUMENTS

| | | | | |
|---|---|---|---|---|
| 3,848,926 | A * | 11/1974 | Kuroishi | B60N 2/7058 297/452.26 |
| 4,191,424 | A * | 3/1980 | Mundell | A47C 7/20 297/452.26 |
| 4,699,427 | A * | 10/1987 | Kobayashi | B29D 99/0092 297/452.27 |
| 5,544,942 | A * | 8/1996 | Vu Khac | A47C 7/18 297/452.27 |
| 6,089,657 | A * | 7/2000 | Banno | A47C 7/022 297/452.27 X |
| 6,481,801 | B1 * | 11/2002 | Schmale | B60N 2/5635 297/452.26 X |
| 6,543,844 | B1 * | 4/2003 | Ryan | A47C 7/022 297/452.26 X |
| 6,893,087 | B2 * | 5/2005 | Hancock | B62J 1/12 297/452.23 X |
| 7,931,333 | B2 * | 4/2011 | Sung | B60N 2/5816 297/452.21 X |
| 8,162,402 | B2 * | 4/2012 | Yamauchi | B60N 2/7035 297/452.21 |
| 2007/0241604 | A1 * | 10/2007 | Saitou | B60N 2/5621 297/452.26 |
| 2009/0058167 | A1 * | 3/2009 | San Miguel | A47C 7/18 297/452.48 |
| 2015/0274048 | A1 | 10/2015 | Mogi et al. | |
| 2015/0291070 | A1 * | 10/2015 | Kitajima | B60N 2/58 297/452.21 |
| 2016/0023584 | A1 * | 1/2016 | Nakada | A47C 27/148 297/452.48 |
| 2016/0039322 | A1 * | 2/2016 | Nakada | B60N 2/646 297/452.48 |
| 2016/0052435 | A1 * | 2/2016 | Nakada | B60N 2/646 297/452.48 |
| 2016/0176328 | A1 * | 6/2016 | Takahashi | B60N 2/70 297/452.21 |

FOREIGN PATENT DOCUMENTS

| | | |
|---|---|---|
| JP | 52-008488 Y | 2/1977 |
| JP | 56-132910 A | 10/1981 |
| JP | 6-015551 U | 3/1994 |
| JP | 2005-021263 A | 1/2005 |
| JP | 2008-132254 A | 6/2008 |
| WO | 2006/102751 A1 | 10/2006 |

OTHER PUBLICATIONS

Communication dated Jan. 19, 2018 from the European Patent Office in counterpart European application No. 16740030.8.
Communication dated Oct. 29, 2018, from State Intellectual Property Office of the P.R.C. in counterpart application No. 201680003752.0.

* cited by examiner

SEAT PAD

CROSS REFERENCE TO RELATED APPLICATIONS

This application is a National Stage of International Application No. PCT/JP2016/050782, filed on Jan. 13, 2016, which claims priority from Japanese Patent Application No. 2015-007648, filed on Jan. 19, 2015, the contents of all of which are incorporated herein by reference in their entirety.

TECHNICAL FIELD

The present invention relates to a seat pad that is formed from a foamed molded body and that is provided with a passenger contact surface.

The present application claims priority on the basis of Japanese Patent Application No. 2015-7648, filed in Japan on Jan. 19, 2015, the content of which is incorporated herein by reference.

BACKGROUND ART

As this type of seat pad, the configuration described, for example, in the below-mentioned Patent Document 1 is known.

RELATED DOCUMENT

Patent Document

[Patent Document 1]
Japanese Utility Model Application, First Publication No. H6-15551

SUMMARY OF INVENTION

Technical Problem

In the conventional seat pad mentioned above, there is room for improvement in terms of increasing the fit while suppressing reductions in the strength (durability) of the seat pad.

The present invention was made in consideration of the aforementioned circumstances, and has the purpose of simultaneously achieving both durability and fit in a seat pad.

Solution to Problem

In order to solve the aforementioned problem, the present invention proposes the following means.

The seat pad according to the present invention is formed from a foamed molded body. A passenger contact surface which, in a plan view of the seat pad, is formed in the shape of a rectangle that is long in the lengthwise direction and short in the widthwise direction, is provided. The passenger contact surface comprises a main pressure-receiving area with which the buttocks or the waist of a passenger come into contact, and a subsidiary pressure-receiving area that is adjacent to the main pressure-receiving area in the lengthwise direction. The passenger contact surface is provided with partitioning grooves that extend in the lengthwise direction and that are arranged across the main pressure-receiving area and the subsidiary pressure-receiving area. A plurality of the partitioning grooves are arranged so as to lie parallel to each other in the widthwise direction. Additional grooves are formed on the bottom surfaces of the partitioning grooves. In the partitioning grooves, the average volume, which is the ratio of the volume of the additional grooves per unit area of the bottom surfaces of the partitioning grooves, is smaller in a first section located in the main pressure-receiving area than in a second section located in the subsidiary pressure-receiving area.

Advantageous Effects of Invention

According to the present invention, the durability and the fit of a seat pad can be simultaneously achieved.

DESCRIPTION OF EMBODIMENTS

Herebelow, a seat pad 10 according to an embodiment of the present invention will be explained with reference to FIG. 1 to FIG. 4.

Figure 1:
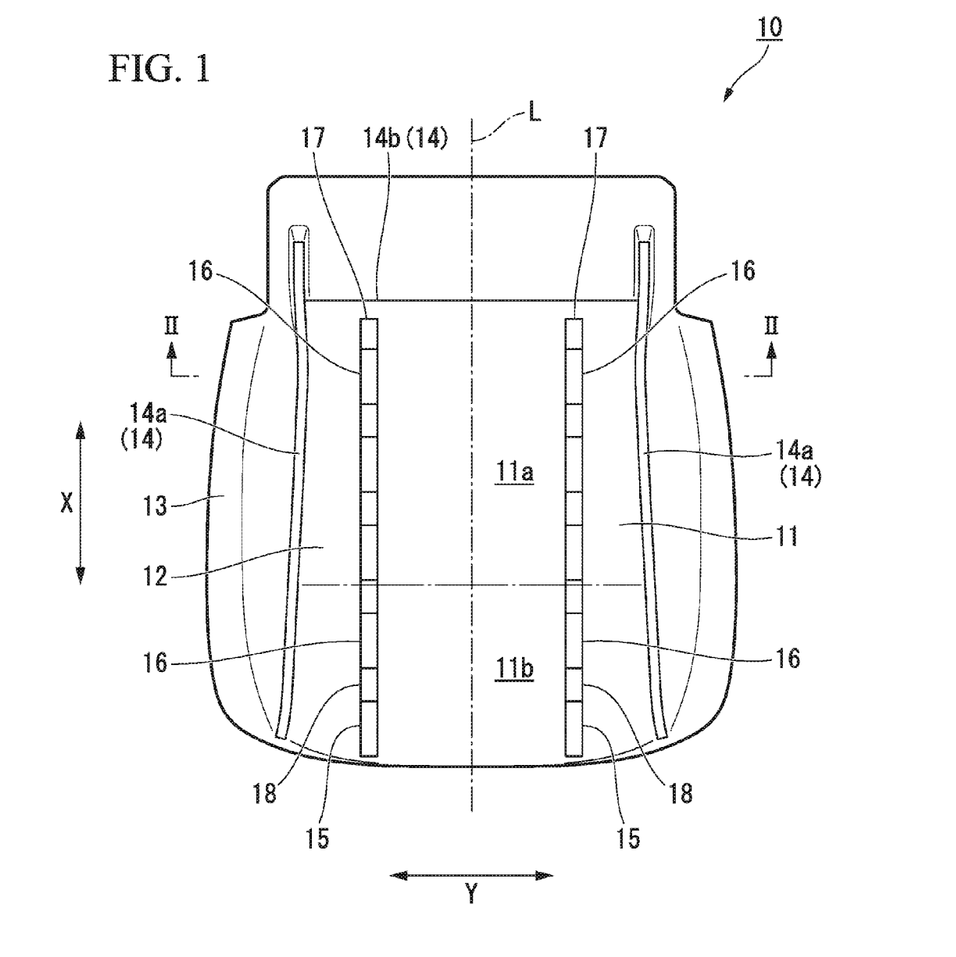
FIG. 1 is a plan view showing a seat pad according to an embodiment of the present invention.
Figure 2:
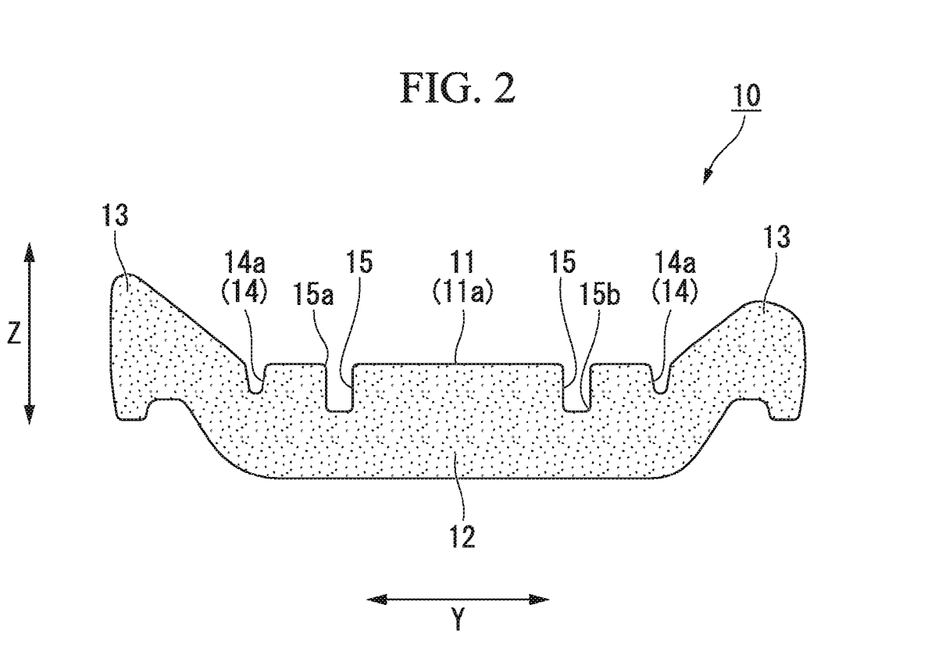
FIG. 2 is a section view cut at the arrows II-II shown in FIG. 1.

As shown in FIG. 1 and FIG. 2, a seat pad 10 is formed from a foamed molded body. Examples of foamed molded bodies include soft resin foamed molded bodies that are molded by foaming a resin material, such as a soft polyurethane foam (soft resin) or the like. In the illustrated example, the seat pad 10 is formed integrally from the same material.

The seat pad 10 is employed as a seat that is mounted, for example, in an automobile (vehicle). The seat pad 10 is provided with a passenger contact surface 11 that is contacted by a passenger H seated in the seat. In the present embodiment, a cushion pad is used as the seat pad 10. When the seat pad 10 is mounted in an automobile, the passenger contact surface 11 faces upward in the vertical direction Z. The weight of the passenger H acts on the seat pad 10 from above.

The seat pad 10 comprises a body portion 12, and a peripheral portion 13 formed along the outer periphery of the body portion 12. The body portion 12 is formed in the shape of a rectangle in a plan view of the seat pad 10. One pair of sides of the rectangle extends along the front-rear direction X of the automobile, and the other pair of sides extends along the left-right direction Y of the automobile. The peripheral portion 13 is provided continuously on the outer periphery of the body portion 12, in the sections located to the rear and on both sides in the left-right direction Y. Of the outer periphery of the body portion 12, the peripheral portion 13 is not provided in the section located on the front side. The peripheral portion 13 exposes the body portion 12 towards the front. The peripheral portion 13 is raised upward with respect to the body portion 12.

The body portion 12 and the peripheral portion 13 are partitioned by valley line portions 14. The valley line portions 14 comprise a pair of first valley line portions 14a extending in the front-rear direction X and a second valley line portion 14b extending in the left-right direction Y. The first valley line portions 14a are formed in the shape of a recessed groove. The second valley line portion 14b connects the portions of the pair of first valley line portions 14a positioned to the rear. The valley line portions 14 are formed so as to be symmetrical in the left-right direction Y with respect to a reference line L in a plan view of the seat pad 10. The reference line L passes through the center of the seat pad 10 in the left-right direction Y, in a plan view of the seat pad 10.

The passenger contact surface 11 is formed by the upper surface of the body portion 12 and the upper surface of the peripheral portion 13. The passenger contact surface 11 is formed in the shape of a rectangle that is long in the front-rear direction X (lengthwise direction) and short in the left-right direction Y (widthwise direction) in a plan view of the seat pad 10. One pair of sides of the rectangle extends in the front-rear direction X and the other pair of sides extends in the left-right direction Y. In the present embodiment, the entirety of the passenger contact surface 11 is formed in the shape of a rectangle that is long in the front-rear direction X in a plan view of the seat pad 10. In addition thereto, of the passenger contact surface 11, the part that is formed by the body portion 12 (hereinafter referred to as the "central portion of the passenger contact surface 11") is also formed so as to be long in the front-rear direction X in a plan view of the seat pad 10. The central portion of the passenger contact surface 11 may be formed as a flat plane.

The central portion of the passenger contact surface 11 comprises a main pressure-receiving area 11a with which the buttocks H1 of a passenger H come into contact, and a subsidiary pressure-receiving area 11b that is adjacent to the main pressure-receiving area 11a in the front-rear direction X and with which the thighs of the passenger H come into contact. The main pressure-receiving area 11a is subjected to a greater load than the subsidiary pressure-receiving area 11b, and is more easily damaged. The main pressure-receiving area 11a is a portion that is located to the rear (towards the main pressure-receiving area in the lengthwise direction) in the central portion of the passenger contact surface 11. The subsidiary pressure-receiving area 11b is a portion that is located to the front (towards the subsidiary pressure-receiving area in the lengthwise direction) in the central portion of the passenger contact surface 11. The main pressure-receiving area 11a is larger than the subsidiary pressure-receiving area 11b in the front-rear direction X. The ratio between the sizes of the main pressure-receiving area 11a and the subsidiary pressure-receiving area 11b in the front-rear direction X is, for example, about 6:4. The main pressure-receiving area 11a and the subsidiary pressure-receiving portion 11b may, for example, be divided by dividing lines, not illustrated, extending in the in the left-right direction Y. The dividing lines may, for example, be ridge lines, valley lines (recessed grooves) or the like.

A plurality of linearly extending partitioning grooves 15 are arranged parallel to each other on the passenger contact surface 11. The plurality of partitioning grooves 15 are arranged in the central portion of the passenger contact surface 11. The plurality of partitioning grooves 15 are formed so as to have the same shape and the same size as each other. The partitioning grooves 15 are arranged so as to extend, in the front-rear direction X, across the main pressure-receiving area 11a and the subsidiary pressure-receiving area 11b. The portions of the partitioning grooves 15 that are located in the main pressure-receiving area 11a are larger, in the front-rear direction X, than the portions that are located in the subsidiary pressure-receiving area 11b. The partitioning grooves 15 are smaller, in the front-rear direction X, than the first valley line portions 14a.

The partitioning grooves 15 are arranged in a pair that is spaced in the left-right direction Y. The pair of partitioning grooves 15 are formed so as to be symmetrical in the left-right direction Y with respect to a reference line L, in a plan view of the seat pad 10. The spacing, in the left-right direction Y, between the pair of partitioning grooves 15 may, for example, be about the same as the distance between the ischium of the passenger H. The distance may specifically be approximately 150-250 mm, more specifically approximately 200 mm.

The groove widths of the partitioning grooves 15 are the same over their entire length. A partitioning groove 15 is formed in the shape of a rectangle that is long in the front-rear direction X, in a plan view of the seat pad 10. Furthermore, as shown in FIG. 2, the groove width of a partitioning groove 15 is the same, regardless of the position in the vertical direction Z. The partitioning grooves 15 are in the shape of a rectangle that is long in the vertical direction Z, in a cross-section view along the left-right direction Y of the seat pad 10. The side surfaces of the partitioning grooves 15 are formed in the shape of a flat plane. The groove width of a partitioning groove 15 is, for example, approximately 3-20 mm. Alternatively, the groove width of the partitioning grooves 15 may, for example, become gradually narrower from an upper side to a lower side in the vertical direction Z.

On the side surfaces of a partitioning groove 15, first chamfered portions 15a are formed on the edge portions forming the surfaces of the openings of the partitioning grooves 15. The first chamfered portions 15a are formed as projecting curved surfaces having a radius of curvature r in a cross-section view along the left-right direction Y of the seat pad 10. The radius of curvature r may, for example, be about 1-20 mm.

The depth of the partitioning grooves 15 is about the same along the entirety thereof. The bottom surfaces of the partitioning grooves 15 are formed in the shape of flat planes. In the illustrated examples, second chamfered portions 15b are formed at the portions connecting the bottom surfaces and the side surfaces of the partitioning grooves 15. The second chamfered portions 15b are formed as concave curved surfaces in a cross-section view along the left-right direction Y of the seat pad 10.

Figure 3:
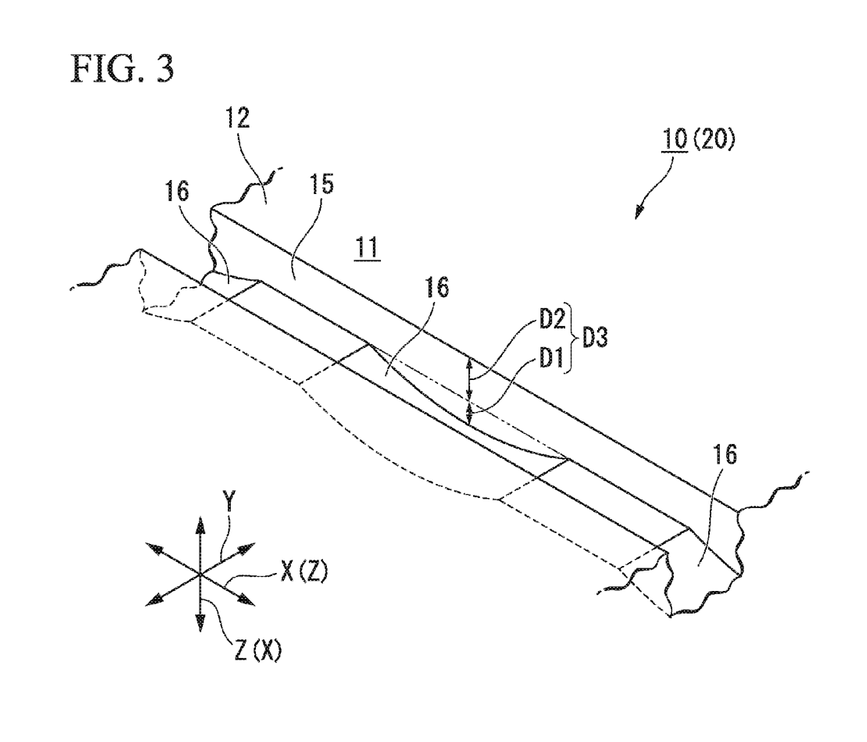
FIG. 3 is an enlarged perspective view of an essential portion of a seat pad.

As shown in FIG. 1 and FIG. 3, additional grooves 16 are formed in the bottom surfaces of the partitioning grooves 15. A plurality of the additional grooves 16 are provided on the bottom surface of a partitioning groove 15, spaced apart in the front-rear direction X. The groove widths of the additional grooves 16 are the same over their entire lengths. The additional grooves 16 are formed in the shape of rectangles that are long in the front-rear direction X in a plan view of the seat pad 10. The groove widths of the additional grooves 16 are the same as the groove widths of the partitioning grooves 15. The side surfaces of the partitioning grooves 15 and the side surfaces of the additional grooves 16 are formed so as to be coplanar.

The size of the additional grooves 16 in the front-rear direction X is greater than the distance, in the front-rear direction X, between additional grooves 16 that are adjacent to each other in the front-rear direction X.

The additional grooves 16 are formed so as to become gradually deeper in approaching the center from the ends in the front-rear direction X. The bottom surfaces of the additional grooves 16 are formed in the shape of concave curved surfaces in a side view in which the additional grooves 16 are viewed from the outside in the left-right direction Y. The depth D1 of the additional grooves 16 is equal to or less than the depth D2 of the partitioning grooves 15. The sum of the depth D1 of the additional grooves 16 and the depth D2 of the partitioning grooves 15 is, for example, approximately 50% to 90% of the thickness of the body portion 12. The aforementioned sum is the total depth D3 from the opening surface of a partitioning groove 15 to the bottom surface of an additional groove 16.

In the partitioning grooves 15, the average volume, which is the ratio of the volume of the additional grooves 16 per unit area of the bottom surfaces of the partitioning grooves 15, is smaller in a first section 17 located in the main pressure-receiving area 11a than in a second section 18 located in the subsidiary pressure-receiving area 11b. In the present embodiment, the area A1 of the bottom surfaces in the first section 17 is greater than the area A2 of the bottom surfaces in the second section 18. Additionally, the sum V1 of the volumes of the additional grooves 16 located in the main pressure-receiving area 11a (the additional grooves 16 formed in the bottom surfaces in the first section 17) is smaller than the sum V2 of the volumes of the additional grooves 16 located in the subsidiary pressure-receiving area 11b (the additional grooves 16 formed in the bottom surfaces in the second section 18). As a result, the average volume V1/A1 in the first section 17 is smaller than the average volume V2/A2 in the second section 18.

When determining the average volumes V1/A1 and V2/A2, it is possible, for example, to determine the average volumes V1/A1 and V2/A2 in units of $mm^3/mm^2$, when considering a unit area of the bottom surface of a partitioning groove 15 to be 1 $mm^2$, and using $mm^3$ as the units for the volume of the additional grooves 16. In the present embodiment, the average volume V2/A2 in the second section 18 is 2.0 to 6.0 ($mm^3/mm^2$) greater than the average volume V1/A1 in the first section 17.

In the plurality of additional grooves 16, the volume becomes greater for the additional grooves 16 located towards the front than for the additional grooves 16 located towards the rear. In the illustrated examples, the plurality of additional grooves 16 have the same length in the front-rear direction X and the same groove width in the left-right direction Y, but have different depths in the vertical direction Z. The plurality of additional grooves 16 become deeper for the additional grooves 16 located towards the front than for the additional grooves 16 located towards the rear. The volumes of the additional grooves 16 are adjusted by changing the depths of the additional grooves 16.

Figure 4:
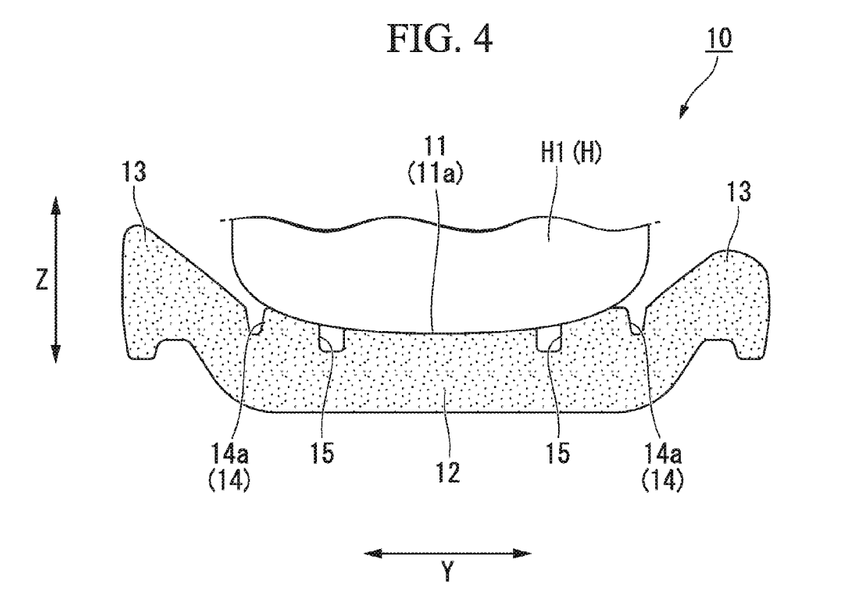
FIG. 4 is a diagram showing a passenger in contact with the passenger contact surface of the seat pad shown in FIG. 1, showing a cross-section corresponding to a section view cut at the arrows II-II shown in FIG. 1.

In the aforementioned seat pad 10, as shown in FIG. 4, when a passenger H seated in the seat comes into contact with the passenger contact surface 11, the buttocks H1 of the passenger H contact the main pressure-receiving area 11a of the passenger contact surface 11, and the thighs contact the subsidiary pressure-receiving area 11b. Therefore, on the passenger contact surface 11, a large load is applied to the main pressure-receiving area 11a, and a small load is applied to the subsidiary pressure-receiving area 11b. At this time, the seat pad 10 compressively deforms, thereby causing a tensile stress, originating in the section of the passenger contact surface 11 that is sunken the most, to be applied along the passenger contact surface 11. Unless this tensile stress is mitigated, the sections of the passenger contact surface 11 on which the tensile stress acts can become taut and constrain the shape of this section, and there is a risk that the fit will be affected.

According to the seat pad 10 of the present embodiment, a plurality of partitioning grooves 15 are arranged parallel to each other on a passenger contact surface 11, and the seat pad 10 is partitioned into multiple sections. As a result, the aforementioned tensile stress acting on the seat pad 10 when a passenger H is seated can be mitigated by being released at the partitioning grooves 15. As a result, the partitioned sections that are divided by the partitioning grooves 15 on the seat pad 10 can be deformed independently of each other in accordance with the load on each partitioned section, and the fit can be improved.

The additional grooves 16 are formed on the bottom surfaces of the partitioning grooves 15. Therefore, the tensile stress mitigation effect can be raised by increasing the depth in portions of the partitioning grooves 15. Additionally, decreases in the strength (durability) of the seat pad 10 can be suppressed in comparison to the case in which the partitioning grooves 15 are formed so as to be deep over the entirety thereof. For the above reasons, both durability and fit can be achieved in the seat pad 10.

In the first section 17, the average volume is smaller than in the second section 18. Therefore, it is possible to suppress excessive decreases in the strength caused by the formation of the additional grooves 16 in the main pressure-receiving area 11a. On the other hand, in the second section 18, the average volume is greater than that in the first section 17. Therefore, the fit of the seat pad 10 overall can be improved. For the above reasons, it is possible to reliably achieve both durability and fit in the seat pad 10.

Additionally, in the second section 18, the average volume is 2.0 to 6.0 ($mm^3/mm^2$) greater than that in the first section 17. For this reason, the fit can be more reliably improved.

In the plurality of additional grooves 16, the volume becomes greater for the additional grooves 16 located towards the front than for the additional grooves 16 located towards the rear. Therefore, the tensile stress mitigation effect due to the additional grooves 16 can be gradually increased from the rear to the front. As a result, the tensile stress mitigation effect can be continuously varied in the front-rear direction X. As a result, both durability and fit of the seat pad 10 can be achieved while suppressing the sense of lumpiness that occurs when the passenger H contacts the passenger contact surface 11.

The size of the additional grooves 16 in the front-rear direction X is greater than the spacing between additional grooves 16 that are adjacent to each other in the front-rear direction X. Therefore, the tensile stress mitigation effect due to the additional grooves 16 can be achieved across a wide range in the front-rear direction X. As a result, it is possible to achieve both durability and fit of the seat pad 10 while better suppressing the sense of lumpiness that occurs when the passenger H contacts the passenger contact surface 11.

The groove width of the additional grooves 16 is the same as the groove width of the partitioning grooves 15, so it is possible to very precisely and easily form the partitioning grooves 15 and the additional grooves 16, while ensuring that a tensile stress mitigation effect by the partitioning grooves 15 is achieved.

Furthermore, the bottom surfaces of the additional grooves 16 are formed in the shape of concave curved surfaces, so it is possible to prevent the passenger H feeling a sense of lumpiness when a load is applied by the passenger H to the seat pad 10 in the vertical direction 7 (thickness direction).

The technical scope of the present invention is not to be construed as being limited to the foregoing embodiments, and various modifications may be made, within a range not departing from the gist of the present invention.

In the foregoing embodiments, a cushion pad was used as the seat pad 10, but the present invention is not limited thereto.

Figure 5:
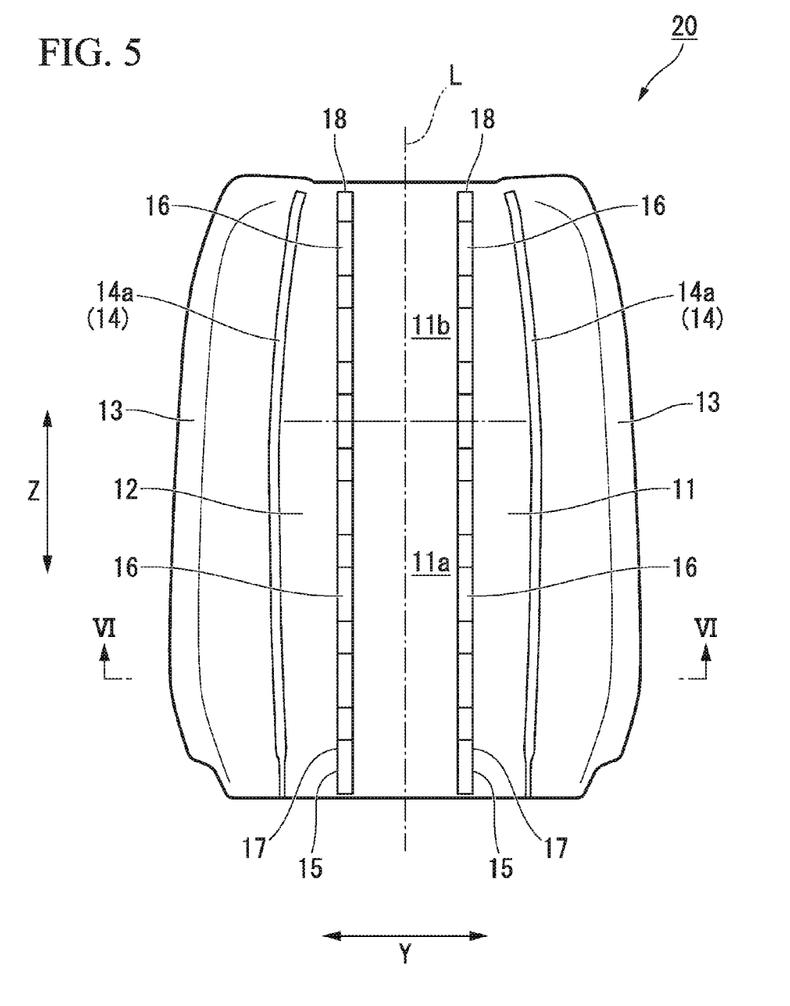
FIG. 5 is a plan view showing a seat pad according to an embodiment of the present invention.
Figure 6:
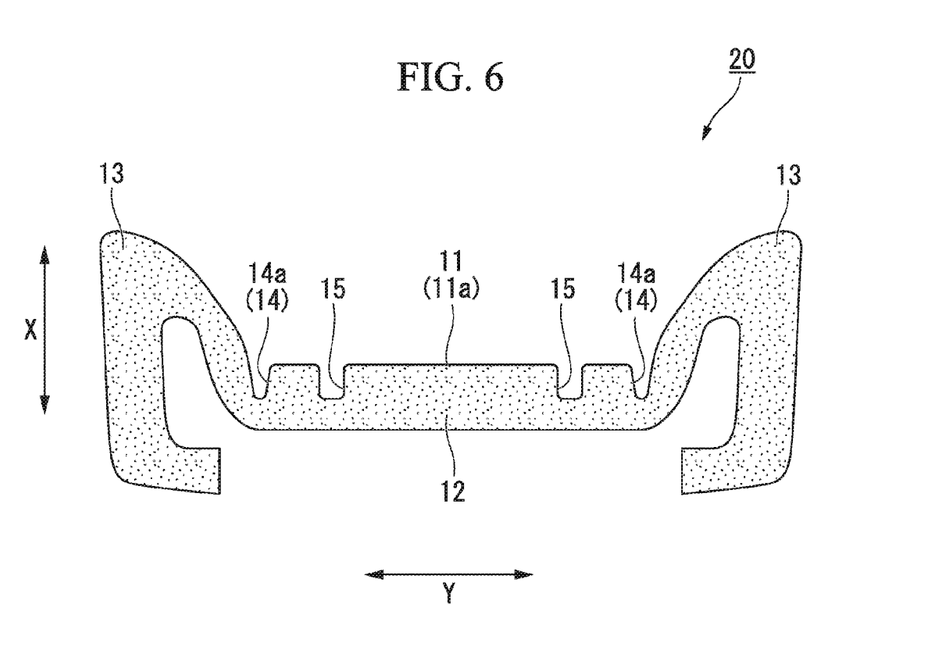
FIG. 6 is a section view cut at the arrows V1-V1 shown in FIG. 5.
Figure 7:
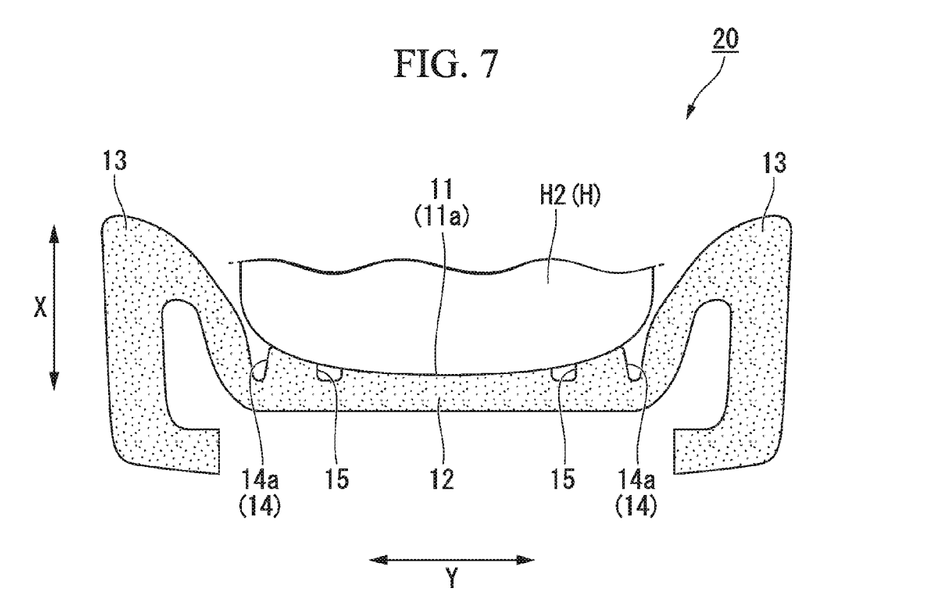
FIG. 7 is a diagram showing a passenger in contact with the passenger contact surface of the seat pad shown in FIG. 5, showing a cross-section corresponding to a section view cut at the arrows V1-V1 shown in FIG. 5.

For example, as shown in FIG. 5 to FIG. 7, it is possible to use a back pad as the seat pad 20. When this seat pad 20 is mounted in an automobile, the passenger contact surface 11 faces towards the front of the automobile. The weight of the passenger H acts on the seat pad 20 from the front. The passenger contact surface 11 is formed in the shape of a rectangle that is long in the vertical direction Z (lengthwise direction) and short in the left-right direction Y (widthwise direction), in a plan view of the seat pad 20. The waist H2 of the passenger H contacts the main pressure-receiving area 11a in a central portion of the passenger contact surface 11. The shoulders of the passenger H contact the subsidiary pressure-receiving area 11b. The main pressure-receiving area 11a is a portion that is located on a lower side (towards the main pressure-receiving area in the lengthwise direction) of the central portion of the passenger contact surface 11. The subsidiary pressure-receiving area 11b is a portion that is located on upper side (towards the subsidiary pressure-receiving area in the lengthwise direction) of the central portion of the passenger contact surface 11.

This seat pad 20 also has a plurality of partitioning grooves 15 that extend in the vertical direction Z, arranged so as to lie parallel to each other, and additional grooves 16 formed in the bottom surfaces of the partitioning grooves 15. As a result, it is possible to achieve functions and effects similar to those of the foregoing embodiments.

Figure 8:
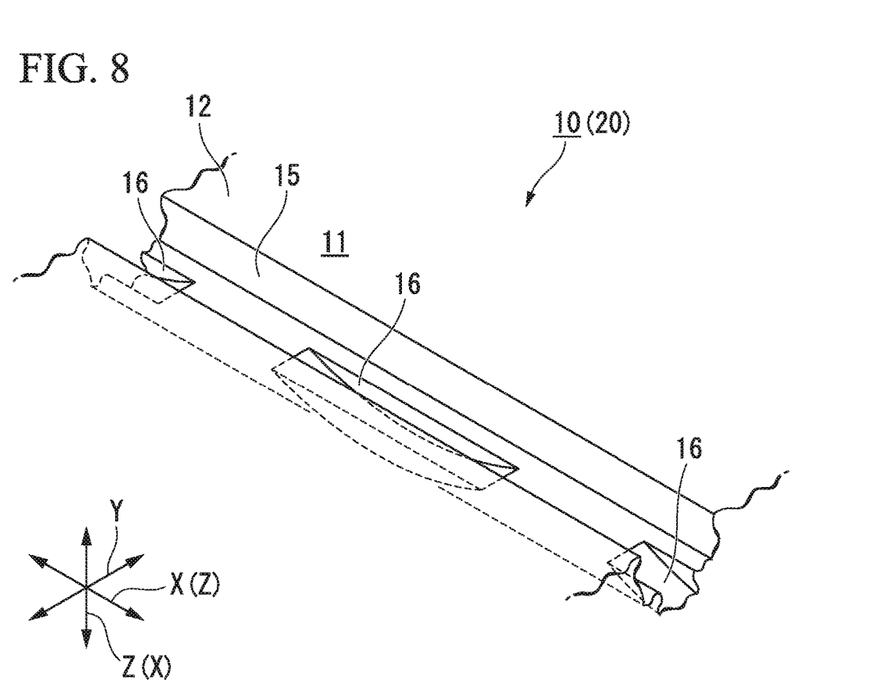
FIG. 8 is an enlarged perspective view of an essential portion of a seat pad according to a modification example of the present invention.

In the foregoing embodiments, the groove widths of the additional grooves 16 were equal to the groove widths of the partitioning grooves 15, but the present invention is not limited thereto. For example, the groove widths of the additional grooves 16 can be made smaller than the groove widths of the partitioning grooves 15, as shown in FIG. 8.

In the foregoing embodiments, the volumes of the additional grooves 16 were adjusted by making the widths of the additional grooves 16 different, but the present invention is not limited thereto. For example, the volumes may be adjusted by making the lengths of the additional grooves 16 (the size in the lengthwise direction) or the groove widths (the size in the widthwise direction) different. When adjusting the average volumes in the first section 17 or the second section 18, the arrangement of the additional grooves 16 may be adjusted instead of adjusting the volumes of the additional grooves 16 themselves. An example of the arrangement is the spacing between adjacent additional grooves 16 or the like.

In the foregoing embodiments, the average volume is smaller in the first section 17 than in the second section 18, but the present invention is not limited thereto.

In the seat pad 10, the partitioning grooves 15 extend in the front-rear direction X. In the seat pad 20, the partitioning grooves 15 extend in the vertical direction Z. In both seat pads 10 and 20, the partitioning grooves 15 extend in the lengthwise direction of the passenger contact surface 11, but the present invention is not limited thereto. The partitioning grooves 15 may be appropriately modified so as to be in other forms formed along the passenger contact surface 11. For example, in both of the seat pads 10 and 20, the partitioning grooves 15 may extend in the left-right direction Y corresponding to the widthwise direction (the direction perpendicular to the lengthwise direction) of the passenger contact surface 11.

In the foregoing embodiments, the seat pads 10 and 20 are integrally formed from the same material, but the present invention is not limited thereto. For example, the material may be made different for each partitioned section of the seat pad 10 or 20.

In addition thereto, it is possible to appropriately replace the elements of the foregoing embodiments with well-known elements, or to appropriately combine the foregoing modification examples.

Next, verification tests were performed for verifying the functions and effects described above.

In these verification tests, the fit, strength and sense of lumpiness were verified for seat pads according to examples and comparative examples.

(Regarding the Seat Pads of the Examples and Comparative Examples)

A total of eight types of seat pads, of Comparative Examples 1 and 2, and Examples 1-6, were prepared. In all of the seat pads, the shapes and sizes of the seat pads themselves and the shapes, sizes, number and arrangement of the partitioning grooves 15 were the same. The lengths of the partitioning grooves 15 were set to 400 mm and the groove widths of the partitioning grooves 15 were set to 10 mm. The length of the first section 17 was set to 250 mm and the length of the second section 18 was set to 150 mm. As a result, the area A1 of the bottom surface of the first section 17 was 2500 mm² and the area A2 of the bottom surface of the second section 18 was 1500 mm².

The seat pads of Comparative Examples 1 and 2 and Examples 1-6 had different shapes, sizes, numbers and arrangements of additional grooves 16. Specifically, the spacing between additional grooves 16 lying adjacent to each other in the lengthwise direction, the lengths of the additional grooves 16 in the lengthwise direction, the depths of the additional grooves 16, the volumes of the additional grooves 16, the number additional grooves, and the average volumes V1/A1 and V2/A2, in each of the first section 17 and the second section 18, were set to be as shown in Table 1 below.

TABLE 1

|  |  | Comp. Ex. 1 | Comp. Ex. 2 | Ex. 1 | Ex. 2 | Ex. 3 | Ex. 4 | Ex. 5 | Ex. 6 |
| --- | --- | --- | --- | --- | --- | --- | --- | --- | --- |
| First Section | Additional groove spacing (mm) | 20 | 20 | 40 | 10 | 20 | 15 | 25 | 25 |
|  | Additional groove length (mm) | 50 | 50 | 50 | 50 | 30 | 30 | 30 | 42.3 |

TABLE 1-continued

|  |  | Comp. Ex. 1 | Comp. Ex. 2 | Ex. 1 | Ex. 2 | Ex. 3 | Ex. 4 | Ex. 5 | Ex. 6 |
|---|---|---|---|---|---|---|---|---|---|
|  | Additional groove depth (mm) | 20 | 20 | 10 | 15 | 10 | 10 | 10 | 7.5 |
|  | Additional groove volume V1 (mm$^3$) | 7451 | 7451 | 3433 | 5339 | 2166 | 2166 | 2166 | 2163 |
|  | Additional groove number | 3 | 3 | 2 | 4 | 5 | 5 | 4 | 3 |
|  | Average volume V1/A1 (mm$^3$/mm$^2$) | 8.9 | 8.9 | 2.7 | 8.5 | 4.3 | 4.3 | 3.5 | 2.6 |
| Second Section | Additional groove spacing (mm) | 20 | 20 | 20 | 10 | 20 | 15 | 15 | 25 |
|  | Additional groove length (mm) | 50 | 50 | 50 | 50 | 50 | 40 | 40 | 49.2 |
|  | Additional groove depth (mm) | 10 | 15 | 20 | 20 | 20 | 20 | 20 | 17.5 |
|  | Additional groove volume V2 (mm$^3$) | 3433 | 5339 | 7451 | 7451 | 7451 | 6280 | 6280 | 6281 |
|  | Additional groove number | 2 | 2 | 2 | 2 | 2 | 2 | 2 | 2 |
|  | Average volume V2/A2 (mm$^3$/mm$^2$) | 4.6 | 7.1 | 9.9 | 9.9 | 9.9 | 8.4 | 8.4 | 8.4 |
|  | V2/V2 − V1/A1 (mm$^3$/mm$^2$) | −4.4 | −1.8 | 7.2 | 1.4 | 5.6 | 4.0 | 4.9 | 5.8 |
|  | Fit | 2 | 3 | 3 | 3 | 5 | 5 | 5 | 5 |
|  | Strength | 3 | 3 | 5 | 3 | 5 | 5 | 5 | 5 |
|  | Sense of lumpiness | 3 | 3 | 3 | 5 | 5 | 5 | 5 | 5 |

In Table 1, the value of the average volume V1/A1 of the first section 17 subtracted from the average volume V2/A2 of the second section 18, and the results of the below-described tests, are also indicated. When the aforementioned subtracted value is greater than 0 (when the value is positive), the average volume V1/A1 of the first section 17 is smaller than the average volume V2/A2 of the second section 18.

(Regarding the Testing Methods)

In the present verification tests, the fit, strength and sense of lumpiness were verified for each seat pad.

For the fit and sense of lumpiness, sensory tests were performed. For the fit, a sensory test was performed regarding the sense of envelopment. For the sense of lumpiness, a sensory test was performed regarding the presence or absence of a sense of continuity. Both tests were graded using a five-step scale from 1 to 5, where a higher value indicates a better grade.

The strength was evaluated on the basis of the rate of occurrence of tears when releasing the seat pad from a mold during the production process. The test was graded using a five-step scale, where an occurrence rate of 15% or more was graded as 1, a rate of 5% or less was graded as 5, and a rate of approximately 10% was graded as 3.

(Regarding the Results)

The results are shown together in Table 1. The seat pads of Examples 1-6 were confirmed as being able to achieve at least one of a reduction in sense of lumpiness and an improvement in strength, while retaining the fit, as compared with the seat pads of Comparative Examples 1 and 2. The seat pads of Examples 3-6 were confirmed to have reduced sense of lumpiness while having an improved fit and strength as compared with the seat pads of Comparative Examples 1 and 2. In Examples 3-6, the aforementioned subtracted value were 2.0 to 6.0 (mm$^3$/mm$^2$).

INDUSTRIAL APPLICABILITY

The present invention simultaneously achieves both durability and fit in a seat pad.

REFERENCE SIGNS LIST 10, 20 Seat pad
11 Passenger contact surface
11a Main pressure-receiving area
11b Subsidiary pressure-receiving area
15 Partitioning groove
16 Additional groove
17 First section
18 Second section
H Passenger
H1 Buttocks
H2 Waist

The invention claimed is:

1. A seat pad formed from a foamed molded body, wherein:
   a passenger contact surface which, in a plan view of the seat pad, is formed in a shape of a rectangle that is long in a lengthwise direction and short in a widthwise direction, is provided;
   the passenger contact surface comprises a main pressure-receiving area with which buttocks or a waist of a passenger come into contact, and a subsidiary pressure-receiving area that is adjacent to the main pressure-receiving area in the lengthwise direction;
   the passenger contact surface is provided with partitioning grooves that extend in the lengthwise direction and that are arranged across the main pressure-receiving area and the subsidiary pressure-receiving area;
   a plurality of the partitioning grooves are arranged parallel to each other in the widthwise direction;
   additional grooves are formed on bottom surfaces of the partitioning grooves;
   in the partitioning grooves, an average volume, which is a ratio of a volume of the additional grooves per unit area of the bottom surfaces of the partitioning grooves, is smaller in a first section located in the main pressure-receiving area than in a second section located in the subsidiary pressure-receiving area; and
   the seat pad is a cushion pad.

2. The seat pad according to claim 1, wherein a groove width of the additional grooves is equal to the groove width of the partitioning grooves.

3. The seat pad according to claim 1, wherein the average volume is 2.0 to 6.0 ($mm^3/mm^2$) larger in the second section than in the first section.

4. The seat pad according to claim 1, wherein:
   a plurality of the additional grooves are provided, spaced apart in the lengthwise direction; and
   the volumes of the plurality of additional grooves become larger, in the lengthwise direction, from the additional grooves located towards the main pressure-receiving area to the additional grooves located towards the subsidiary pressure-receiving area.

5. The seat pad according to claim 4, wherein a size of the additional grooves in the lengthwise direction is greater than a spacing between additional grooves that lie adjacent to each other in the lengthwise direction.

6. The seat pad according to claim 1, wherein the bottom surfaces of the additional grooves are formed in a shape of a concave curved surface.

\* \* \* \* \*